United States Patent Office 3,570,090
Patented Mar. 16, 1971

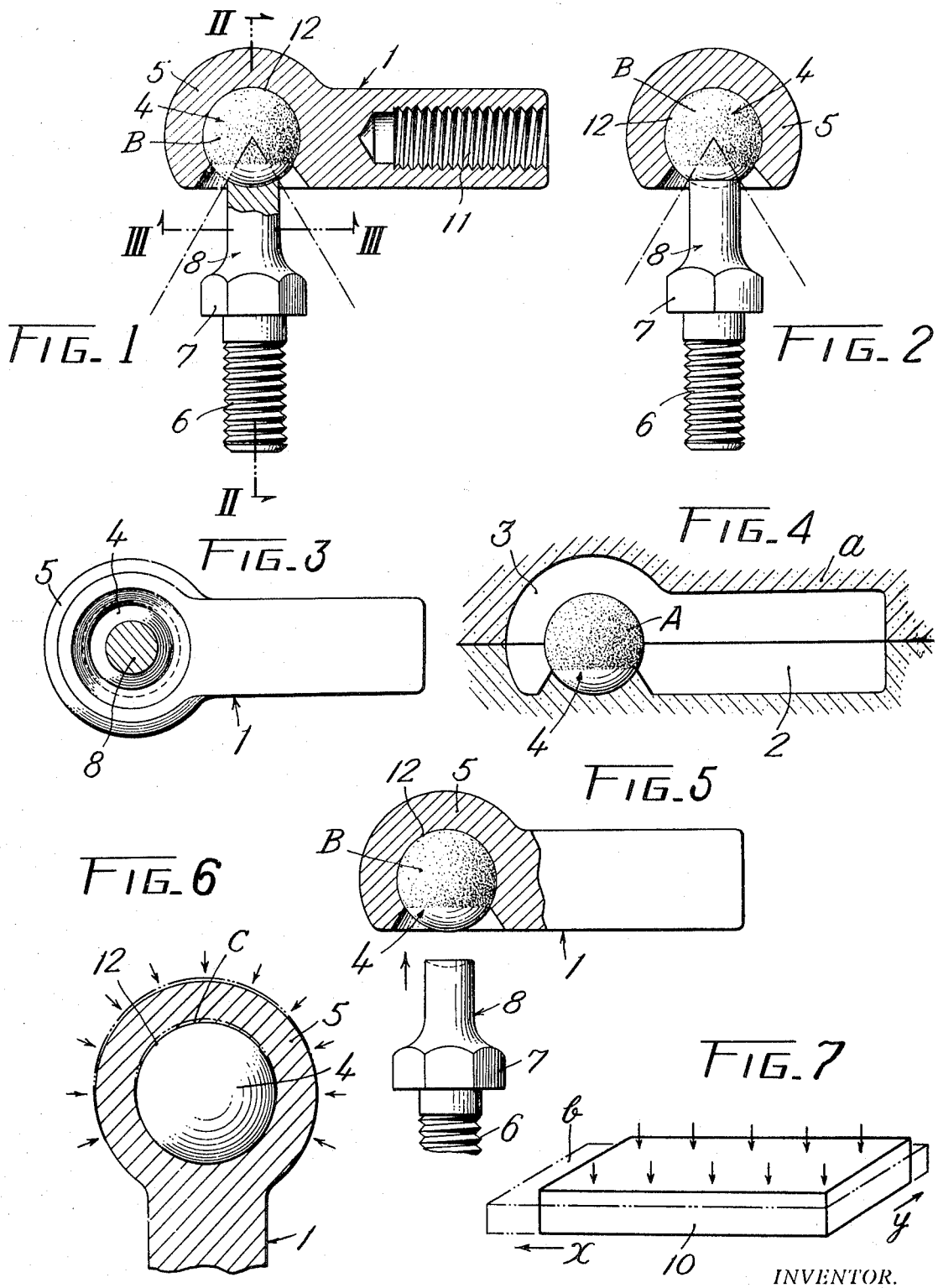

3,570,090
METHOD FOR THE MANUFACTURE OF
BALL JOINTS
Hiroshi Teramachi, Tokyo, Japan, assignor to Nippon
Thompson Co., Ltd., Tokyo, Japan
Filed Jan. 27, 1969, Ser. No. 794,097
Claims priority, application Japan, July 9, 1968,
43/47,963
Int. Cl. B23p 11/00, 17/00
U.S. Cl. 29—149.5                                          1 Claim

ABSTRACT OF THE DISCLOSURE

This specification discloses a method for the manufacture of ball joints, which comprises preparing a mold consisting of upper and lower halves for forming the joint portion or outer rod of a ball joint, and positioning in this mold a steel ball having a thin film of tin, copper or lead applied over a part of the surface thereof. The manner of positioning is such that the steel ball rests as a "core" on the lower half of said mold. The method of the invention further comprises casting a charge of molten aluminium into said mold to thereby form an outer rod having a spherical head portion made of said cast aluminium which holds the steel ball therewithin, and simultaneously forming a cast aluminium alloy portion of a high bearing performance in said spherical portion of the outer rod. The thus formed outer rod with the steel ball held therein is removed from the mold and formed with an internally threaded bore axially thereof toward the outer end thereof. An inner rod is then joined by friction welding to the exposed surface of the steel ball. The spherical head portion of the outer rod is struck from the exterior thereof to provide a clearance between the spherical head portion and the steel ball so that the steel ball can rotate within the spherical head portion of the outer rod. The ball joint thus obtained is simple in construction and economical to manufacture as well as accurate and excellent in performance.

BACKGROUND OF THE INVENTION

This invention relates to a method for the manufacture of ball joints.

According to the prior art the manufacture of ball joints was very complicated, and consequently the resultant ball joints were not only very expensive but also inefficient in performance.

SUMMARY OF THE INVENTION

It is therefore the object of the present invention to readily and economically provide a method of making ball joints of simple construction and high performance.

According to the present invention the method for the manufacture of ball joints comprises the steps of preparing a mold consisting of upper and lower halves for forming the joint portion or outer rod of a ball joint, positioning in said mold a steel ball having a thin film of tin, copper or lead applied partly over the surface thereof in such a manner that the steel ball rests as a core on the lower half of said mold, casting a charge of molten aluminium into said mold to thereby form an outer rod having a spherical head portion made of said cast material closely holding said steel ball therewith, simultaneously forming a cast aluminium alloy portion having a high performance as a plain bearing in said spherical portion of said outer rod, removing said formed outer rod with said steel ball from the mold, forming an internally threaded bore axially of said outer rod toward the outer end thereof, joining by friction welding a special bolt or inner rod having an external thread and a hexagonal flange to the exposed surface of said steel ball closely held in said head portion of said outer rod, striking said spherical head portion of said outer rod from the exterior thereof to thereby provide a clearance between the inner surface of said spherical head portion and the surface of said steel ball closely held therein, whereby the steel ball having the inner rod joined thereto can rotate within the head portion of the outer rod holding the steel ball.

DESCRIPTION OF A PREFERRED EMBODIMENT

The invention will now be described in greater detail with respect to a preferred embodiment thereof as shown in the accompanying drawings, in which:

FIG. 1 is aside view, in longitudinal cross-section, of a ball joint provided by the method according to the present invention;

FIG. 2 is a cross-sectional view taken along line II—II of FIG. 1;

FIG. 3 is a cross-sectional view taken along line III—III of FIG. 1;

FIG. 4 is a longitudinal cross-sectional view showing the mold used in the casting process according to the present invention, in which the steel ball has a thin film of tin, copper or lead applied partly over the surface thereof;

FIG. 5 is a partly cross-sectional side view showing the manner in which the inner rod is joined by friction welding to the steel ball having its thin film of tin, copper or lead mixed with the molten aluminium to form a film of cast aluminium alloy having a high bearing performance;

FIG. 6 is an enlarged, fragmentary view, partly in cross-section, showing the manner in which a clearance is provided in the spherical portion of the ball joint; and FIG. 7 is a view illustrating the principle of the FIG. 6 procedure.

Referring now to the drawings, a mold generally indicated by the letter a in FIG. 4 is previously prepared to form the joint portion of a ball joint as shown in FIG. 1. The mold a may conveniently be a die-casting mold suitable for mass production which consists of upper and lower halves, and has therein a molding cavity 2 including an undercut spherical space 3 for forming the head portion of the ball joint. Within said spherical space 3 of the mold is positioned in place a steel ball 4 having the surface thereof partially plated or coated with a thin film A of tin, copper or lead, FIG. 4, in such a manner that the steel ball rests as a "core" on the lower half of the mold as shown in FIG. 4. A charge of molten aluminium is introduced into said molding cavity 2, whereupon said thin film of tin, copper or lead having a low melting point is mixed with said molten aluminium to thereby form a film B of aluminium alloy having a high bearing performance, FIG. 5. Thus, in the mold, there is formed a joint portion embracing a steel ball in the head portion thereof. The thus formed joint portion with the steel ball embraced therein is then cooled down while it is in the mold, whereafter it is removed from the mold. After removal from the mold, the joint portion or outer rod 1 has the steel ball 4 securely held in place within the head portion 5 thereof. At this point the outer rod 1 is in such relationship with the steel ball 4 that it tightens the latter due to the difference in coefficient of contraction between said two members, whereby rotation of the steel ball 4 is prevented in the outer rod 1. Through the utilization of such difference in coefficient of contraction, a special bolt or inner rod 8 is joined by friction welding to said steel ball 4, the special bolt or inner rod 8 being provided with an external thread 6 and a hexagonal flange 7 as shown in FIG. 5. This friction welding operation is impossible in the case where the material used for the outer rod is of a low contraction coefficient which would permit the steel ball to rotate. In such a case the steel ball 4 and the spherical bolt or inner rod 8 may be friction-welded together prior to the molding process, whereafter said molding operation may be started in the manner as described above.

Subsequently, in the manner as shown in FIG. 6, the head portion 1 of the outer rod 1, that is, the spherical portion holding the steel ball is struck in the surface thereof from the exterior, whereby said spherical portion of the outer rod is brought into a rolled state and thereby a clearance c is provided at 12 between the inner surface of the spherical portion and the outer surface of the steel ball.

The principle for the formation of such clearance will be explained with reference to FIG. 7. Now assume that a base plate 10 having a predetermined thickness is subjected to rolling. Then the base plate 10 will be dilated lengthwise and widthwise in the manner as represented by the arrows $x$ and $y$ so that the base plate is rolled into a form as shown by the imaginary lines. This will help to readily understand how the foregoing clearance is formed between the spherical head portion and the steel ball.

Thereafter the formed outer rod or joint portion 1 is subjected to removal of casting and welding fins formed thereon, and an internally threaded bore 11 (FIG. 1) is axially formed in the outer rod 1 in the known manner, whereby there is obtained an end product as shown in FIGS. 1 and 3.

In the ball joint thus produced, the hardness of the steel ball 4, which is normally in the range of HrC 60 to 66, drops to the order of HrC 40 to 45, since the steel ball is exposed to a high temperature during the casting of the outer rod 1. However, the outer rod 1 retains a sufficient function as a metal because the contact between this rod and the steel ball 4 is a surface contact and because the spherical portion of the outer rod 1 holding the steel ball is formed of a cast aluminium alloy which has a high performance as a plain bearing.

Also, the use of friction welding for joining the inner rod 8 to the steel ball 4 leads to an advantage that the steel ball in use may be one of a commercially available low-cost but having a high degree of spherical precision and a very highly smooth surface.

Furthermore, the film coating provided over a part of the steel ball surface serves to help the cast material readily fit to the ball surface and prevent any pores or the like from being produced in the outer rod, whereby the spherical portion thereof can be of high quality.

Still furthermore, the clearance c between the spherical portion of the outer rod 1 and the steel ball 3 can be readily determined by adjusting the degree in which said spherical portion holding the steel ball therewithin is struck from the exterior, and consequently the end product obtained can be of high accuracy and high performance as well as of light weight and low deformability. Moreover, the ball joint produced according to the method of the present invention reduces the number of the parts required and simplifies the steps of process involved, which in turn leads to a lower cost of manufacture.

Whilst the present invention has been described with respect to a preferred embodiment thereof, it should be noted that the true scope of the invention is only limited by the appended claim.

What is claimed is:

1. A method for the manufacture of ball joints, comprising the steps of preparing a mold consisting of upper and lower halves for forming the joint portion or outer rod of a ball joint, positioning in said mold a steel ball having a thin film of tin, copper or lead applied partly over the surface thereof in such a manner that the steel ball rests as a core on the lower half of said mold, casting a charge of molten aluminium into said mold to thereby form an outer rod having a spherical head portion made of said cast material closely holding said steel ball therewithin simultaneously forming a cast aluminium alloy portion having a high performance as a plain bearing in said spherical portion of said outer rod, removing said formed rod with said steel ball from the mold, forming an internally threaded bore axially of said outer rod toward the outer end thereof, joining by friction welding a special bolt or inner rod having an external thread and a hexagonal flange to the exposed surface of said steel ball closely held in said head portion of said outer rod, striking said spherical head portion of said outer rod from the exterior thereof to thereby provide a clearance between the inner surface of said spherical head portion and the surface of said steel ball closely held therein, whereby the steel ball having the inner rod joined thereto can rotate within the head portion of the outer rod holding the steel ball.

References Cited

UNITED STATES PATENTS

| 2,252,351 | 8/1941 | Paulus | 29—149.5 |
| 3,134,169 | 5/1964 | Hollander et al. | 29—470.3 |
| 3,269,001 | 8/1966 | Hollander | 29—470.3 |
| 3,395,436 | 8/1968 | Sullivan | 29—149.5 |

THOMAS H. EAGER, Primary Examiner

U.S. Cl. X.R.

29—157.5, 441